(12) United States Patent
Spanjers et al.

(10) Patent No.: US 7,703,273 B2
(45) Date of Patent: Apr. 27, 2010

(54) DUAL-MODE CHEMICAL-ELECTRIC THRUSTERS FOR SPACECRAFT

(76) Inventors: Gregory G. Spanjers, 20 Kiva Pl., Sandia Park, NM (US) 87047; Kevin Mahaffy, 10228 Avenal St., Oak Hills, CA (US) 92345; Ronald A. Spores, 21800 Quail Springs Rd., Tehachapi, CA (US) 93561; David White, 4360 San Juan Ct., Rosamond, CA (US) 93560; Michael Dulligan, Lancaster, CA (US); Marcy Dulligan, legal representative, 43424 16th St. West, Apt. 24, Lancaster, CA (US) 93534; Hieu Nguyen, 2727 Sandstone Ct., Palmdale, CA (US) 93551

( * ) Notice: Subject to any disclaimer, the term of this patent is extended or adjusted under 35 U.S.C. 154(b) by 1698 days.

(21) Appl. No.: 10/701,030

(22) Filed: Nov. 3, 2003

(65) Prior Publication Data
US 2009/0139206 A1 Jun. 4, 2009

Related U.S. Application Data

(60) Provisional application No. 60/423,241, filed on Nov. 1, 2002.

(51) Int. Cl.
*F02K 9/94* (2006.01)
(52) U.S. Cl. .................................. 60/253; 60/203.1
(58) Field of Classification Search .................. 60/202, 60/203.1, 224, 225, 253, 254, 256
See application file for complete search history.

(56) References Cited

U.S. PATENT DOCUMENTS

| 5,847,315 | A | 12/1998 | Katzakian, Jr. et al. |
|---|---|---|---|
| 5,924,278 | A | 7/1999 | Burton et al. |
| 6,153,976 | A | 11/2000 | Spanjers |
| 6,269,629 | B1 | 8/2001 | Spanjers |
| 6,373,023 | B1 | 4/2002 | Hoskins et al. |
| 6,769,241 | B2 * | 8/2004 | Spanjers et al. ............ 60/203.1 |

OTHER PUBLICATIONS

Altman et al., "Chapter 7: Hybrid Rocket Propulsion Systems," Published in Space Technology Series: Space Propulsion Analysis and Design, McGraw-Hill, 1995, pp. 365-441, Cover pgs (2).
Ashby et al., "Quasi-Steady-State Pulsed Plasma Thrusters," AIAA Journal, vol. 4, No. 5, May 1966, pp. 831-835.
Aston et al., "Ignitor Plug Operation In A Pulsed Plasma Thruster," Journal of Spacecraft, vol. 19, No. 3, May-Jun. 1982, pp. 250-256.

(Continued)

*Primary Examiner*—Timothy D Collins
(74) *Attorney, Agent, or Firm*—Christie, Parker & Hale, LLP

(57) ABSTRACT

Spacecraft thrusters capable of dual-mode operation, and a method of applying propulsion to a spacecraft using a dual-mode thruster are provided. In one embodiment, the thrusters of the current invention can operate as a chemical motor to provide high thrust and low propellant exhaust velocity to achieve fast maneuverability, or as an electric propulsion thruster to provide low thrust and high exhaust velocity to perform maneuvers with a minimal amount of propellant.

36 Claims, 3 Drawing Sheets

OTHER PUBLICATIONS

Barber et al., "Microthrusters Employing Catalytically Reacted $N_2$-$O_2$-$H_2$ Gas Mixtures, Tridyne," Journal of Spacecraft, vol. 8, No. 2, Feb. 1971, pp. 111-116.

Bartoli et al., "A Liquid Caesium Field Ion Source For Space Propulsion," J. Phys. D: Applied Phys., vol. 17, 1984, pp. 2473-2483.

Bassner et al., "The Design of RITA Electric Propulsion System for Sat 2 (Artemis)," AIAA/DGLR/JSASS 21st International Electric Propulsion Conference, Jul. 18-20, 1990, AIAA Paper No. 90-2539, pp. 1-7, Cover pg. (1).

Bayt et al., "A Performance Evaluation Of MEMS-Based Micronozzles," 33rd AIAA/ASME/SAE/ASEE Joint Propulsion Conference and Exhibit, Jul. 7-9, 1997, AIAA Paper No. 97-3169, pp. 1-10, Cover pg. (1).

Beattie et al., "Flight Qualification Of An 18-mN Xenon Ion Thruster," AIAA/AHS/ASEE Aerospace Design Conference, Feb. 16-19, 1993, AIAA Paper No. 93-1085, pp. 1-7, Cover pg. (1).

Berkopec, "Performance Of Two Subliming-Solid-Propellant Thrustor Systems For Attitude Control of Spacecraft," NASA Technical Note No. D-3841, Feb. 1967, pp. 1-15, Cover pg. (1).

Blandino et al., "Propulsion Requirements And Options For The New Millennium Interferometer (DS-3) Mission," 34th AIAA/ASME/SAE/ASEE Joint Propulsion Conference and Exhibit, Jul. 13-15, 1998, AIAA Paper No. 98-3331, pp. 1-11, Cover pg. (1).

Bromaghim et al., "An Overview Of The On-Orbit Results From The ESEX Flight Experiment," 35th AIAA/ASME/SAE/ASEE Joint Propulsion Conference and Exhibit, Jun. 20-24, 1999, AIAA Paper No. 99-2706, pp. 1-13, Cover pg. (1).

Brown, C., "Spacecraft Propulsion, Chapter 1," AIAA Education Series 1996, pp. 1-7, Cover pgs. (3).

Brown, C., "Spacecraft Propulsion, Chapter 3," AIAA Education Series, 1996, pp. 25-53, Cover pg. (1).

Bryant et al., "Planetary Lander Vehicles Utilizing LEAP Technology," 30th AIAA/ASME/SAE/ASEE Joint Propulsion Conference, Jun. 27-29, 1994, AIAA Paper No. 94-2748, pp. 1-7, Cover pg. (1).

Burton et al., "Energy Balance And Efficiency Of The Pulsed Plasma Thruster," 34th AIAA/ASME/SAE/ASEE Joint Propulsion Conference and Exhibit, Jul. 12-15, 1998, AIAA Paper No. 98-3808, pp. 1-10, Cover pg. (1).

Burton et al., "Pulsed Plasma Thruster," Journal of Propulsion and Power, vol. 14, No. 5, Sep.-Oct. 1998, pp. 716-735.

Bzibziak, Sr., R. Miniature Cold Gas Thrusters, AIAA/SAE/ASME/ASEE 28th Joint Propulsion Conference and Exhibit, Jul. 6-8, 1992, AIAA Paper No. 92-3256, 7 pgs, Cover pg. (1).

Craddock et al., "Design And Development Of The Army KE ASAT ACS Thruster," AIAA/SAE/ASME/ASEE 29th Joint Propulsion Conference and Exhibit, Jun. 28-30, 1993, AIAA Paper No. 93-1959, 6 pgs., Cover pg. (1).

Cubbin et al., "Pulsed Thrust Measurements Using Laser Interferometry," Rev. Sci. Instrum., vol. 68, No. 6, Jun. 1997, pp. 2339-2346.

de Groot et al., "Chemical Microthruster Options," 32nd AIAA/ASME/SAE/ASEE Joint Propulsion Conference, Jul. 1-3, 1996, AIAA Paper No. 96-2868, pp. 1-16, Cover pg. (1).

de Groot et al., "Preliminary Results Of Solid Gas Generator Micro-Propulsion," 34th AIAA/ASME/SAE/ASEE Joint Propulsion Conference and Exhibit, Jul. 13-15, 1998, AIAA Paper No. 98-3225, pp. 1-9, Cover pg. (1).

Driscoll et al., "Development Tests On A 5-LBF Bipropellant Thruster Using A Platinum/Rhodium Thrust Chamber," AIAA, 1998, pp. 1-11.

Ebert et al., "Operational Nova Spacecraft Teflon Pulsed Plasma Thruster System," AIAA/ASME/SAE/ASEE 25th Joint Propulsion Conference, Jul. 10-12, 1989, AIAA Paper No. 89-2497, 10 pgs., Cover pg. (1).

Fehringer et al., "Space-Proven Indium Liquid Metal Field Ion Emitters For Ion Microthruster Applications," 33rd AIAA/ASME/SAE/ASEE Joint Propulsion Conference and Exhibit, Jul. 6-9, 1997, AIAA Paper No. 97-3057, pp. 1-11, Cover pg. (1).

Fleeter, "Chapter 2: Propulsion-Or How To Get There," published in Micro Space Craft, The Edge City Press, 1995, pp. 7-43, Cover pg. (1).

Forsythe, R., "Impulse And Thrust Test Of A Subliminating-Solid Micropropulsion System," NASA Technical Note No. D-3245, Mar. 25, 1966, pp. 1-23, Cover pgs (2).

Genovese et al., "Neutralization Tests Of A mN FEEP Thruster (Field Emission Electric Propulsion)," AIAA, ASME, SAE, and ASEE, Joint Propulsion Conference and Exhibit, 32nd, Jul. 1-3, 1996, AIAA Paper No. 96-2725, pp. 1-6, Cover pg. (1).

Gorshkov, "Low-Power Hall Type And Ion Electric Propulsion For The Small Sized Spacecraft," 34th AIAA/ASME/SAE/ASEE Joint Propulsion Conference and Exhibit, Jul. 13-15, 1998, AIAA Paper No. 98-3929, pp. 1-8, Cover pg. (1).

Greer et al., "Dynamic Performance Of A Subliming Solid Reaction Jet," 2nd International Conference on Automatic Control In Space 2, Sep. 4-8, 1967, pp. 521-540, Cover pg. (1).

Guman et al., "Exhaust Plume Studies Of A Pulsed Plasma Thruster," AIAA/DGLR 13th International Electric Propulsion Conference, Apr. 25-27, 1978, AIAA Paper No. 78-704, pp. 1-8, Cover pg. (1).

Guman et al., "Pulsed Plasma Microthruster For Synchronous Meteorological Satellite (SMS)," AIAA 10th Electric Propulsion Conference, Oct. 31-Nov. 2, 1973, AIAA Paper No. 73-1066, pp. 1-9, Cover pg. (1).

Guman et al., "Pulsed Plasma Microthruster Propulsion System For Synchronous Orbit Satellite," Journal of Spacecraft, vol. 7, No. 4, Apr. 1970, pp. 409-415.

Haag, "PPT Thrust Stand," 31st AIAA/ASME/SAE/ASEE Joint Propulsion Conference and Exhibit, Jul. 10-12, 1995, AIAA Paper No. 95-2917, pp. 1-12, Cover pg. (1).

Hardt et al., "The Chemistry Of Subliming Solids For Micro Thrust Engines," Astronautica Acta, vol. 11, No. 5, Sep.-Oct. 1965, pp. 340-347, Cover pg. (1).

Heister, S., "Chapter 6: Solid Rocket Motors," Space Propulsion Analysis And Design, McGraw-Hill, Inc., 1995, pp. 295-363, Cover pgs. (2).

Helmy, A.M., "Chronicle Review Of The Hybrid Rocket Combustion," 30th AIAA/ASME/SAE/ASEE Joint Propulsion Conference, Jul. 27-29, 1994, AIAA Paper No. 94-2881, pp. 1-5, Cover pg. (1).

Hodge et al., "Development And Test of The ASAT Bipropellant Attitude Control System (ACS) Engine," AIAA/SAE/ASME/ASEE 29th Joint Propulsion Conference and Exhibit, Jun. 28-30, 1993, AIAA Paper No. 93-2587, pp. 1-10, Cover pg. (1).

Huberman et al., "Advanced High-Thrust Colloid Sources," Journal of Spacecraft, vol. 11, No. 7, Jul. 1974, pp. 475-480.

Jacobson et al., "Test Results Of A 200 W Class Hall Effect Thruster," 34th AIAA/ASME/SAE/ASEE Joint Propulsion Conference and Exhibit, Jul. 13-15, 1998, AIAA Paper No. 98-3792, pp. 1-9, Cover pg. (1).

Jankovsky, R., "HAN-Based Monopropellant Assessment For Spacecraft," 32nd AIAA/ASME/SAE/ASEE Joint Propulsion Conference, Jul. 1-3, 1996, AIAA Paper No. 96-2863, pp. 1-7, Cover pg. (1).

Jankovsky et al., "Performance Of A Fakel K10K Resistojet," AIAA/ASME/SAE/ASEE Joint Propulsion Conference and Exhibit, Jul. 6-9, 1997, AIAA Paper No. 97-3059, pp. 1-11, Cover pg. (1).

Jones, R., "Coffee-Can-Sized Spacecraft," Aerospace America, vol. 26, No. 10, Oct. 1988, pp. 36-38, Cover pg. (1).

Jones, R., "Electromagnetically Launched Micro Spacecraft For Space Science Missions," AIAA Aerospace Sciences Conference, Jan. 11, 1988, AIAA Paper No. 88-0068, pp. 1-9, Cover pg. (1).

Jones, R., "Microspacecraft Missions And Systems," Journal of the British Interplanetary Soc., vol. 42, No. 10, Oct. 1989, pp. 448-454, Cover pg. (1).

Jones et al., "Microspacecraft Technology For Planetary Science Missions," undated, IAF Paper No. 91-051, pp. 1-10.

Jones, R., "Think Small—In Large Numbers," Aerospace America, vol. 27, No. 10, Oct. 1989, pp. 14-17, Cover pg. (1).

Kanning, G., "Measured Performance Of Water Vapor Jets For Space Vehicle Attitude Control Systems," NASA Technical Note D-3561, Aug. 29, 1966, pp. 1-24, Cover pg. (1).

Ketsdever et al., "The Free Molecule Micro-Resistojet: An Interesting Alternative to Nozzle Expansion," 34th AIAA/ASME/SAE/ASEE Joint Propulsion Conference and Exhibit, Jul. 13-15, 1998, AIAA Paper No. 98-3918, pp. 1-16, Cover pg. (1).

Khayms et al., "Design Of A Miniaturized Hall Thruster for Microsatellites," 32nd AIAA/ASME/SAE/ASEE Joint Propulsion Conference, Jul. 1-3, 1996, AIAA Paper No. 96-3291, pp. 1-7, Cover pg. (1).

Kidd et al., "Life Test (4350 Hours) Of An Advanced Colloid Thruster Module," AIAA 10th Electric Propulsion Conference, Oct. 31-Nov. 2, 1973, AIAA Paper No. 73-1078, pp. 1-10, Cover pg. (1).

Kindsvater, H., "Simplified Space Mechanisms Using Subliming Solids," First Aerospace Mechanisms Symposium, May 19-20, 1966, pp. 239-249, Cover pg. (1).

Lawrence et al., "Performance Testing Of A Resistojet Thruster For Small Satellite Applications," 34th AIAA/ASME/SAE/ASEE Joint Propulsion Conference and Exhibit, Jul. 12-16, 1998, AIAA Paper No. 98-3933, pp. 1-10, 4 pg. chart, Cover pg. (1).

MacLellan et al., "Lincoln Experimental Satellites 5 And 6," AIAA 3rd Communications Satellite Systems Conference, Apr. 6-8, 1970, AIAA Paper No. 70-494, pp. 1-11, Cover pg. (1).

Mahoney et al., "Electrohydrodynamic Ion Source," Journal of Applied Physics, vol. 40, No. 13, Dec. 1969, pp. 5101-5106.

Marcuccio et al., "Development Of A Miniaturized Field Emission Propulsion System", 34th AIAA/ASME/SAE/ASEE Joint Propulsion Conference and Exhibit, Jul. 13-15, 1998, AIAA Paper No. 98-3919, pp. 1-15, Cover pg. (1).

Marcuccio et al., "Flight Demonstration Of FEEP On Get Away Special," 34th AIAA/ASME/SAE/ASEE Joint Propulsion Conference and Exhibit, Jul. 13-15, 1998, AIAA Paper No. 98-3332, pp. 1-11, Cover pg. (1).

Marrese et al., "Chapter 11: Performance Of Field Emission Cathodes In Xenon Electric Propulsion System Environments," Progress in Astronautics and Aeronautics: Micropropulsion for Small Spacecraft, vol. 187, pp. 271-302, Cover pg. (1).

Martinez-Sanchez et al., "Spacecraft Electric Propulsion—An Overview," Journal of Propulsion and Power, vol. 14, No. 5, Sep./Oct. 1998, pp. 688-699.

Maycock et al., "A Photochemical Microrocket For Attitude Control," Journal Spacecraft, vol. 6, No. 3, Mar. 1969, pp. 336-337.

McFall et al., "Pulsed Thruster Thrust Stand Measurement Evaluations," AIAA/ASME/SAE/ASEE Joint Propulsion Conference and Exhibit, Jul. 12-15, 1998, AIAA Paper No. 98-3805, pp. 1-8, Cover pg. (1).

McGrath, D., "The History Of Thiokol Star™ Motor Missions," 31st AIAA/ASME/SAE/ASEE Joint Propulsion Conference and Exhibit, Jul. 10-12, 1995, AIAA Paper No. 95-3129, pp. 1-10, Cover pg. (1).

McGrath, D., "Star™ Motors With Movable Nozzles," 31st AIAA/ASME/SAE/ASEE Joint Propulsion Conference and Exhibit, Jul. 10-12, 1995, AIAA Paper No. 95-3020, pp. 1-8, Cover pg. (1).

Meinhardt et al., "Development And Testing of New, HAN-Based Monopropellants In Small Rocket Thrusters," 34th AIAA/ASME/SAE/ASEE Joint Propulsion Conference and Exhibit, Jul. 13-15, 1998, AIAA Paper No. 98-4006, pp. 1-10, Cover pg (1).

Mendel, et al., "Carbon Plasma Gun$^{a)}$," Rev. Sci. Instrum., vol. 51, No. 12, Dec. 1980, pp. 1641-1644.

Mittendorf et al., "Experimental Development Of A Monopropellant For Space Propulsion Systems," 33rd AIAA/ASME/SAE/ASEE Joint Propulsion Conference and Exhibit, Jul. 6-9, 1997, AIAA Paper No. 97-2951, pp. 1-19, Cover pg. (1).

Mitterauer, J., "Contamination Test Of A Cesium Field Ion Thruster," Journal of Propulsion, vol. 7, No. 3, May-Jun. 1991, pp. 364-367.

Mitterauer, J., "Field Emission Electric Propulsion: Emission Site Distribution Of Slit Emitters," IEEE Transactions on Plasma Science, vol. PS-15, No. 5, Oct. 1987, pp. 593-598.

Mitterauer, J., "Miniaturized Liquid Metal Ion Sources (MILMIS)," IEEE Transactions on Plasma Science, vol. 19, No. 5, Oct. 1991, pp. 790-799.

Mueller et al., "Chapter 8: Vaporizing Liquid Microthruster Concept: Preliminary Results Of Initial Feasibility Studies," Progress in Astronautics and Aeronautics: Micropropulsion for Small Spacecraft, vol. 187, 2000, pp. 215-230, Cover pg. (1).

Mueller et al., "Chapter 12: Electric Breakdown Characteristics Of Silicon Dioxide Films For Use In Microfabricated Ion Engine Accelerator Grids," Progress in Astronautics and Aeronautics: Micropropulsion for Small Spacecraft, vol. 187, 2000, pp. 303-334, Cover pg. (1).

Mueller et al., "Chapter 17: Micro-Isolation Valve Concept: Initial Results Of A Feasibility Study," Progress in Astronautics and Aeronautics: Micropropulsion for Small Spacecraft, vol. 187, 2000, pp. 399-422, Cover pg. (1).

Mueller et al. "Design Of Tridyne Pressurization System For Liquid Oxygen/Polybutadiene Hybrid Rocket Motors," AIAA/SAE/ASME 27th Joint Propulsion Conference, Jun. 24-26, 1991, AIAA Paper No. 91-2406, pp. 1-6, Cover pg. (1).

Mueller, J., "Thruster Options For Microspacecraft: A Review And Evaluation Of Existing Hardware And Emerging Technologies," 33rd AIAA/ASME/SAE/ASEE Joint Propulsion Conference and Exhibit, Jul. 6-9, 1997, AIAA Paper No. 97-3058, pp. 1-29, Cover pg. (1).

Myers et al., "Pulsed Plasma Thruster Contamination," 32nd AIAA/ASME/SAE/ASEE Joint Propulsion Conference, Jul. 1-3, 1996, AIAA Paper No. 96-2729, 13 pgs., Cover pg. (1).

"NASA Contractor Report: Development Of The Subliming Solid Control Rocket: Phase II," Prepared by Rocket Research Corporation, Contact No. NAS 5-9070, NASA Report No. CR-712, 1967, pp. 1-104, 10 pg. Table of Contents, Cover pg. (1).

"NASA Contractor Report: Subliming Solid Control Rocket: Phase 1," Prepared by Rocket Research Corporation, Contractor No. NAS 5-3599NASA Report No. CR-711, 1967, pp. 1-151, 5 pg. Table of Contents, Cover pg. (1).

Owens, Jr, W., "An Experimental Investigation Of Superheated Subliming Solid Thruster Performance," Journal of Spacecraft and Rockets, vol. 8, No. 7, Jul. 1971, pp. 806-809, Cover pg. (1).

Owens, Jr, W., "Design Aspects Of Subliming Solid Reaction Control Systems," ICRPG/AIAA 3rd Solid Propulsion Conference, Jun. 4-6, 1968, AIAA Paper No. 68-516, pp. 1-20, Cover pg. (1).

Patterson M.J., "Low-Power Ion Thruster Development Status," 34th AIAA/ASME/SAE/ASEE Joint Propulsion Conference and Exhibit, Jul. 13-15, 1998, AIAA Paper No. 98-3347, pp. 1-12, Cover pg. (1).

Perel et al., "Air Force Electric Propulsion Programs," AIAA International Electric Propulsion Conference, Nov. 14-17, 1976, AIAA Paper No. 76-1067, pp. 1-5, Cover pg. (1).

Perel, J., "Alkali Metal Ion Sources," J. Electrochem. Society: Reviews and News., vol. 115, No. 12, Dec. 1968, pp. 343C-350C.

Perel et al., "Investigation Of The Capillaritron Ion Source For Electric Propulsion," AIAA/JSASS/DGLR 15th International Electric Propulsion Conference, Apr. 21-23, 1981, AIAA Paper No. 81-0747, 6 pgs., Cover pg. (1).

Perel et al., "Research And Development Of A Charged-Particle Bipolar Thruster," AIAA Journal, vol. 7, No. 3, Mar. 1969, pp. 507-511.

Petagna, et al., "Field Emission Electric Propulsion (FEEP): Experimental Investigation On Continuous And Pulsed Modes Of Operation," undated, Paper No. 88-127, pp. 708-721, Cover pg. (1).

Pfeffer et al., "The Electric Propulsion Activities Of The European Space Agency": AIAA/DGLR 13th International Electric Propulsion Conference, Apr. 25-27, 1978, AIAA Paper No. 78-713, pp. 1-10, Cover pg. (1).

Rosenberg et al., New Generation Of High-Performance Engines For Spacecraft Propulsion, Journal of Propulsion and Power, vol. 10, No. 1, Jan.-Feb. 1994, pp. 40-46.

Rudolph et al., "Pulsed Plasma Thruster Blackflow Characteristics," AIAA/SAE/ASME 15th Joint Propulsion Conference, Jun. 18-20, 1979, AIAA Paper No. 79-1293, pp. 1-8, Cover pg. (1).

Rudolph et al., "Pulsed Plasma Thruster Contamination Studies," Princeton/AIAA/DGLR 14th International Electric Propulsion Conference, Oct. 30-Nov. 1, 1979, AIAA Paper No. 79-2106, pp. 1-8, Cover pg. (1).

Ruttle et al., "Development of Miniature 35-LBF Fast Response Bipropellant Divert Thruster," AIAA/SAE/ASME/ASEE 29th Joint Propulsion Conference and Exhibit, Jun. 28-30, 1993, AIAA Paper No. 93-2585, pp. 1-2, Cover pg. (1).

Schaub et al., "Spacecraft Formation Flying Control Using Mean Orbit Elements," Astrodynamics 1999: Part 1: Advances in the Astronautical Sciences, Proceedings of the AAS/AIAA Astrodynamics Conference, Aug. 16-19, 1999, vol. 103, pp. 163-181, Cover pg. (1).

Schilling et al., "Micropropulsion Options For The TechSat21 Space-Based Radar Flight," Progress in Astronautics and Aeronautics, undated, vol. 187, pp. 3-23, Cover pg. (1).

Schwende et al., "New Generation Of Low-Thrust Bi-Propellant Engines In Qualification Process," AIAA/SAE/ASME/ASEE 29th Joint Propulsion Conference and Exhibit, Jun. 28-30, 1993, AIAA Paper No. 93-2120, pp. 1-10.

Sciulli et al., "Self Consuming Satellite Program," AIAA Space Technology Conference & Exposition, Sep. 28-30, 1999, AIAA Paper No. 99-4480, pp. 1-6, Cover pg. (1).

Sellers et al., "A Low-Cost Propulsion Option For Small Satellites," Journal of the British Interplanetary Society, vol. 48, No. 3, Mar. 1995, pp. 129-138, Cover pg. (1).

Spanjers et al., "Effect Of Propellant Temperature On Efficiency In The Pulsed Plasma Thruster," Journal of Propulsion and Power, vol. 14, No. 4, Jul.-Aug. 1998, pp. 545-553.

Spanjers et al., "Investigation Of Propellant Inefficiencies In A Pulsed Plasma Thruster," 32nd AIAA/ASME/SAE/ASEE Joint Propulsion Conference, Jul. 1-3, 1996, AIAA Paper No. 96-2723, pp. 1-11, Cover pg. (1).

Spanjers et al., "PPT Research At AFRL: Material Probes To Measure The Magnetic Field Distribution In A Pulsed Plasma Thruster," 34th AIAA/ASME/SAE/ASEE Joint Propulsion Conference and Exhibit, Jul. 12-15, 1998, AIAA Paper No. 98-3659, pp. 1-15, Cover pg. (1).

Spanjers et al., "Propellant Losses Because Of Particulate Emission In A Pulsed Plasma Thruster," Journal of Propulsion and Power, vol. 14, No. 4, Jul.-Aug. 1998, pp. 554-559.

Staehle, "Small Planetary Missions For The Space Shuttle," American Astronautical Society Publication, Space Shuttle: Dawn of an Era, Oct. 29-Nov. 1, 1979, Los Angeles, California, Paper No. 79-288, vol. 41, Part II, pp. 918-938, Cover pgs. (2).

Strand et al., "Extended Duty Cycle Testing Of Spacecraft Propulsion Miniaturized Components," 31st AIAA/ASME/SAE/ASEE Joint Propulsion Conference and Exhibit, Jul. 10-12, 1995, AIAA Paper No. 95-2810, 11 pgs., Cover pg. (1).

Sutherland et al, "A Review Of Microrocket Technology: $10^{-6}$ to 1 LBF Thrust," Journal Spacecraft and Rockets, vol. 3, No. 8, Aug. 1966, pp. 1153-1165.

Tingling, B., "Measured Steady-State Performance Of Water Vapor Jets For Use In Space Vehicle Attitude Control Systems," NASA Technical Note D-1302, May 1962, pp. 1-21, Cover pg. (1).

Turchi et al., "Optimization Of Pulsed Plasma Thrusters For Microsatellite Propulsion," 35th AIAA/ASME/SAE/ASEE Joint Propulsion Conference and Exhibit, Jun. 20-24, 1999, AIAA Paper No. 99-2301, pp. 1-15, Cover pg. (1).

Vondra et al., "Flight Qualified Pulsed Electric Thruster For Satellite Control," Journal of Spacecraft, vol. 11, No. 9, Sep. 1974, pp. 613-617.

Wernimont et al., "Hydrogen Peroxide Hybrid Rocket Engine Performance Investigation," 30th AIAA/ASME/SAE/ASEE Joint Propulsion Conference, Jun. 27-29, 1994, AIAA Paper No. 94-3147, 7 pgs., Cover pg. (1).

Wichmann et al., "Miniature High Performance Delta V Engine," AIAA/SAE/ASME/ASEE 29th Joint Propulsion Conference and Exhibit, Jun. 28-30, 1993, AIAA Paper No. 93-2582, pp. 1-5, Cover pg. (1).

Williams et al., "Performance Testing Of A Solid Propellant Pulsed Plasma Microthruster," AIAA 9th Electric Propulsion Conference, Apr. 17-19, 1972, AIAA Paper No. 72-460, pp. 1-16, Cover pg. (1).

Young et al., "Investigation Of A Candidate Non-Magnetic Ion Micro-Thruster For Small Spacecraft Applications," 34th AIAA/ASME/SAE/ASEE Joint Propulsion Conference and Exhibit, Jul. 13-15, 1998, AIAA Paper No. 98-3917, pp. 1-13, Cover pg. (1).

\* cited by examiner

DUAL-MODE CHEMICAL-ELECTRIC THRUSTERS FOR SPACECRAFT

CROSS-REFERENCE TO RELATED APPLICATION

The current application claims priority on U.S. Provisional Application No. 60/423,241, filed Nov. 1, 2002, the disclosure of which is incorporated herein by reference.

STATEMENT OF FEDERAL FUNDING

The federal government may have rights under this application pursuant to funding provided under Air Force Grant No. F04611-00-C-0036.

FIELD OF INVENTION

The invention relates to the field of spacecraft propulsion, and more specifically to propulsion systems for spacecraft with mission requirements for both high thrust and high specific impulse propulsion capabilities.

BACKGROUND OF THE INVENTION

Spacecraft propulsion generally falls into two classes—chemical and electric. Chemical propulsion thrusters (solid motors, liquid engines, or hybrids) have high thrust, which translates to fast maneuverability and short transit times at the expense of using a relatively large mass of propellant. Electric propulsion (EP) thrusters have high exhaust velocity and low thrust. EP thrusters have the advantage of using about $1/10^{th}$ the propellant mass at the expense of relatively long transit times. The EP systems also provide a smaller impulse-bit than the chemical propulsion systems making them better suited for fine positioning spacecraft maneuvers.

In general it would seem that a spacecraft designer would always choose the EP system to take advantage of the propellant mass savings, however, for many spacecraft maneuvers the longer trip times of the EP system are unacceptable. In general EP is used for maneuvers where trip time is not an issue. These include north-south station-keeping (NSSK) for geosynchronous (GEO) satellites, east-west station-keeping (EWSK), attitude control, and drag make-up in low earth orbits (LEO). In contrast, chemical systems are used in applications such as orbit transfer, divert propulsion on interceptor satellites used in missile defense, and proximity operations for microsatellites performing maneuvers near other space objects, where time is of an essence.

To overcome the inherent disadvantages of both propulsion systems, it is common in spacecraft design to include multiple propulsion systems to independently provide high thrust and high exhaust velocity capability. For example, a Boeing 702 communications satellite contains two independent propulsion systems; a chemical rocket is used for a rapid orbit transfer from low orbit to a position near the final geosynchronous orbit, while an EP system is used to complete the orbit transfer using less propellant mass than the chemical rocket would have used. Once in a geosynchronous orbit the EP thrusters move to face north and south. For the 15 year lifetime of the satellite they will be fired for about 1 hour/week to perform NSSK orbit corrections.

One prospective example of the need for multiple propulsion systems on satellites is for use on microsatellites. One microsatellite mission is to act as a defensive escort for a high-value space asset such as the International Space Station, or an expensive communications satellite. These escort satellites would need EP to fly near the host satellite while consuming a minimum of propellant, however, if a threat to the host appears, the escort microsatellite will need high thrust chemical propulsion to quickly respond and intercept the threat. Alternatively, if a microsatellite was designed for inspection missions the microsatellite would need EP for precision pointing and drag make-up, however, near the target the microsatellite will need high-thrust chemical propulsion to circumnavigate the object at close range.

Despite the clear need for a multiple mode propulsion system, such systems are are inherently complex because of the need for multiple control systems and fuel sources. There are currently no propulsion systems that can operate in a chemical or electric mode using the same propellant for the two modes of operation.

Accordingly, a need exists for a propulsion system having both high thrust and high specific impulse propulsion capabilities

SUMMARY OF THE INVENTION

The current invention is directed to a propulsion system that can operate in either a high-thrust-mode (chemical) or a high-exhaust-velocity mode (electric) on command using a single common source of propellant. The propulsion system combines methods for controlling the ignition, combustion rate, and extinguishment of a solid motor using an Electrically Controlled Extinguishable Solid Propellant (ECESP) and a solid propellant motor that uses such a material and is controlled by the application and removal of electrical current, and additionally the use of these ECESP propellants in an electric propulsion device known as the Pulsed Plasma.

There are currently no propulsion systems that can operate in a chemical or electric mode using the same propellant for the two modes of operation.

In one exemplary embodiment the invention is directed to a dual mode spacecraft thruster where electrodes embedded in the exhaust nozzle provide additional electrical acceleration to the exhaust of a chemical rocket motor.

In another exemplary embodiment the invention is directed to a dual mode spacecraft thruster where the solid motor combustion is controlled by the application of electricity.

In still another exemplary embodiment the invention is directed to a dual mode spacecraft thruster where the electrical energy to the nozzle electrodes is provided by an intermediate energy storage device such as a capacitor.

BRIEF DESCRIPTION OF THE DRAWINGS

These and other features and advantages of the present invention will be better understood by reference to the following detailed description when considered in conjunction with the accompanying drawing wherein.

DETAILED DESCRIPTION OF INVENTION

The current invention is directed to a propulsion system that can operate in either a high-thrust-mode (chemical) or a high-exhaust-velocity mode (electric) on command using a single common source of propellant. Accordingly, the current propulsion system replaces the multiple chemical and electric propulsion systems with a single propulsion system thereby reducing mass, cost and complexity.

Using a common propellant for the chemical and electric propulsion allows the spacecraft significant orbit flexibility. For example, using the example of the escort satellite, if no requirement (i.e. threat) appears for the high thrust chemical thruster, all of the propellant can be used in the EP thruster thereby increasing lifetime. Using the case of the LEO-GEO orbit transfer, the customer can choose after launch how much of the propellant to allocate to high-thrust (decreasing trip time), and how much propellant to allocate to high exhaust velocity of EP (decreasing propellant consumption).

Figure 1:
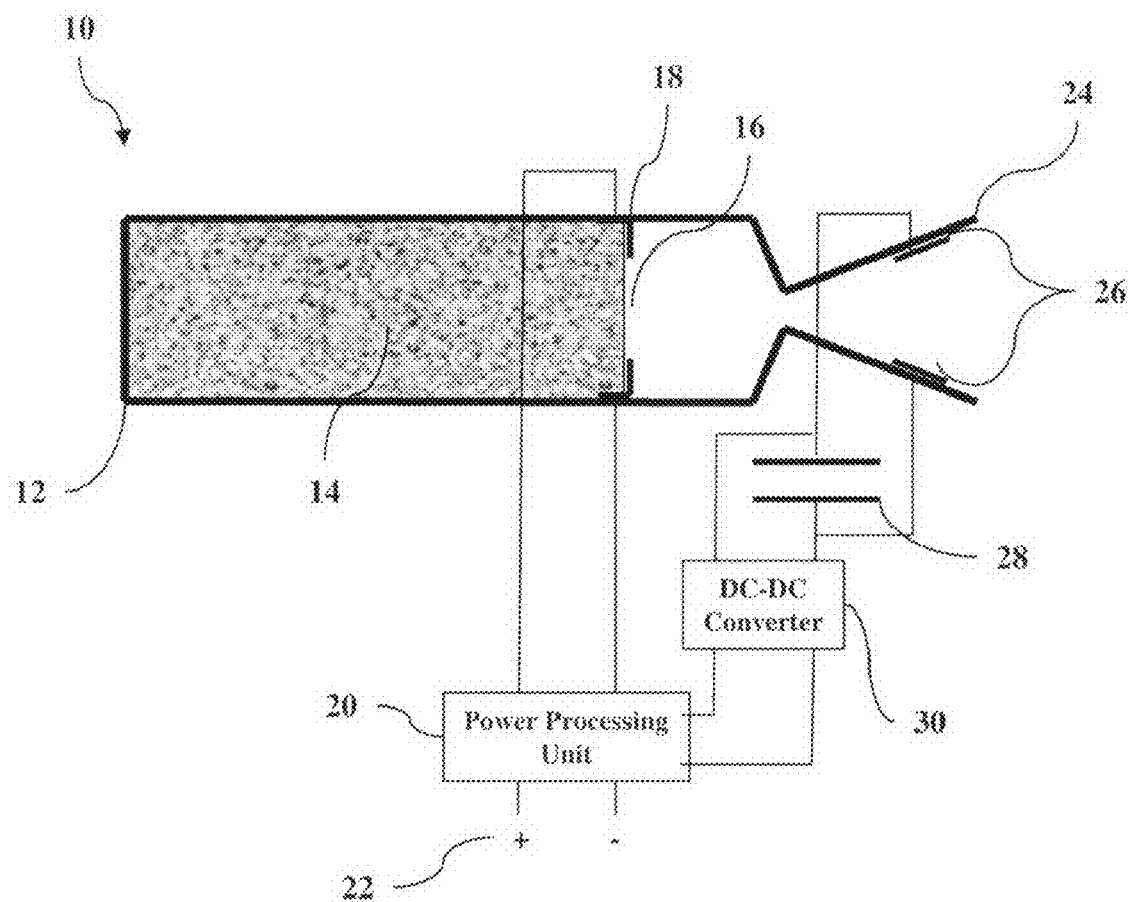
FIG. 1 shows a somewhat schematic diagram of an exemplary embodiment of a dual mode chemical-electric thruster according to one embodiment of the invention.

A schematic diagram of an embodiment of the dual-mode chemical electric thruster in accordance with the current invention is shown in FIG. 1. As shown, in one embodiment, the thruster 10 consists of a solid motor casing 12 of any suitable design containing a formulation of the electrically-controlled extinguishable solid propellants (ECESPs) 14 disclosed by Katzakian et al (U.S. Prov. App. No. 60/287,799, filed on Apr. 30, 2001), the disclosure of which is incorporated herein by reference. At the propellant face 16 are two electrodes 18 for applying electric current to the face of the ECESP material 14 so as to control the combustion and burn rate.

Although one electrode design is shown in FIG. 1, any suitable electrode arrangement may be utilized with the current invention. For example, several suitable electrode designs and methods are disclosed by Dulligan, et al. (U.S. patent application Ser. Nos. 10/342,003, and 10/342,718), the disclosures of which are incorporated herein by reference. Current is applied to the electrodes 18 by the power processing unit (PPU) 20, which converts the spacecraft bus power 22 to the voltage and current waveform needed to energize the ECESP propellant 14. To direct the thrust produced by the propulsion system 10 the front of the chemical motor is a rocket nozzle 24 of traditional design. Embedded in the nozzle is an additional set of electrodes 26 used to electrically accelerate the exhaust propellant to a high exhaust velocity. A capacitor 28 is attached to the electric electrodes for energy storage. A DC-DC converter 30 is used to charge the energy storage capacitor. The DC-DC converter in turn is charged on command by the PPU 20.

The thruster device of the current invention is thus able to electrically control the combustion of a solid propellant. This enables very fast ignition and extinguishment of the solid propellant, and thereby enables the device to combust a very small amount of mass. This is of principal importance in the operation the thruster in the electric high exhaust velocity mode. In such a mode, to electrically accelerate the combustion products to high velocity, the capacitor must supply energy sufficient to the mass of the object according to the equation $mv^2$, where m is the mass to be accelerated and v is the exhaust velocity. The energy available for electric acceleration is realistically limited to less than about 100 Joules by capacitor mass and technology. Therefore the mass to be accelerated must be kept to extremely low levels (<100 micrograms) for the electrical acceleration to be effective. If the mass created in the propellant combustion is too high, the available capacitor energy will only provide a partial acceleration, and increases in exhaust velocity will quickly become negligible.

Although the above discussion has focused on those portions of the thruster that provide ignition and propulsion, it should be understood that the dual-mode thruster of the current invention may also include supporting mechanical and electronic devices. For example, the dual-mode thruster may include a programmable or hardwired control system to provide a means for the thruster to switch between the high thrust and high exhaust velocity modes of propulsion.

In addition, although the above discussion has focused on the design of the thruster itself, the current invention is also directed to a method of propelling a satellite using the thruster. As discussed above, a thruster designed in accordance with the current invention may be operated in two different mode, either a high thrust mode (analogous to a conventional chemical thruster), or a high exhaust velocity mode (analogous to a conventional electrical propulsion system). The difference in operation of the propulsion system is shown schematically in FIGS. 2 and 3.

Figure 2:
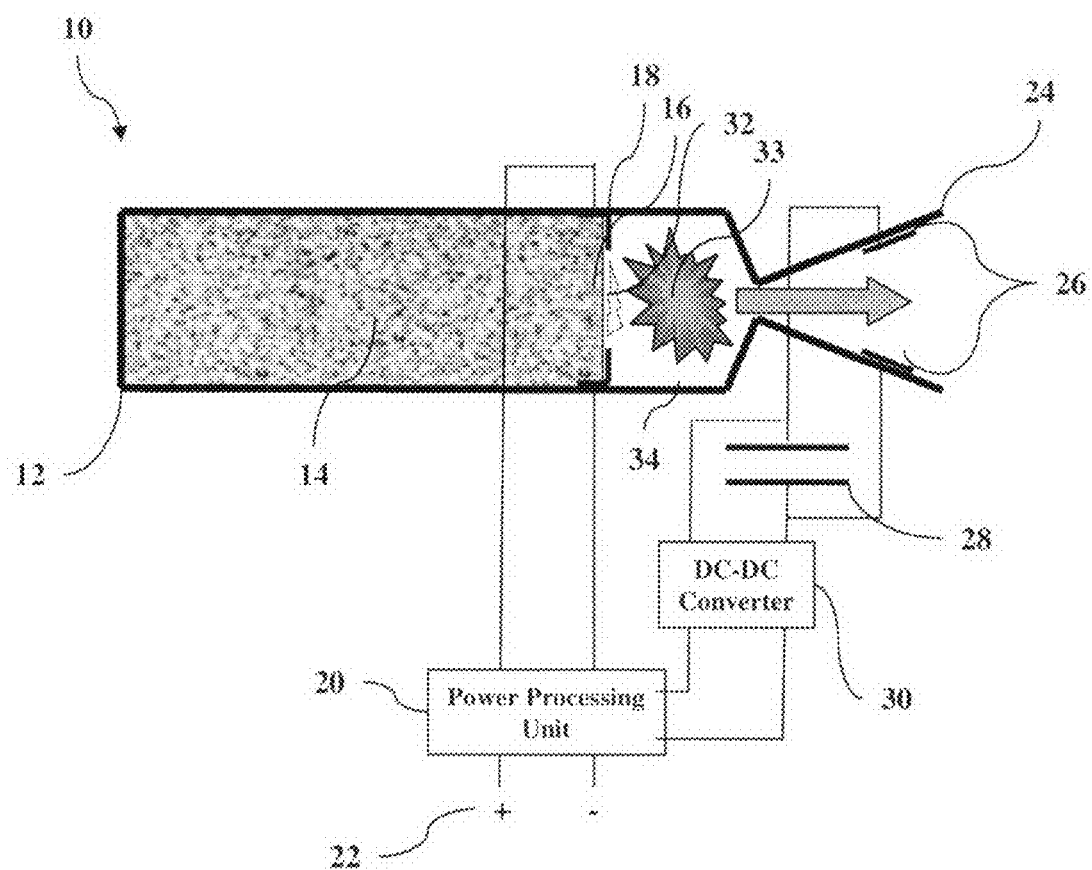
FIG. 2 shows a somewhat schematic diagram of an exemplary embodiment of a dual mode chemical-electric thruster according to one embodiment of the invention during a high thrust operation.
Figure 3:
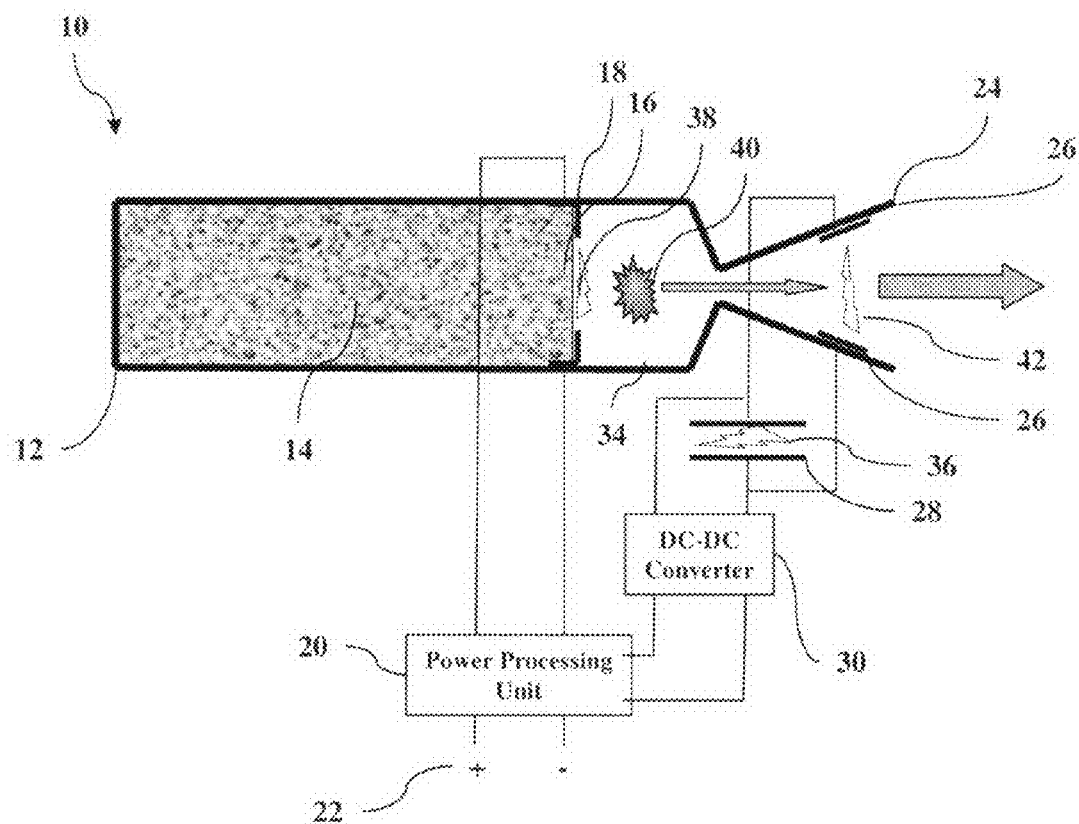
FIG. 3 shows a somewhat schematic diagram of an exemplary embodiment of a dual mode chemical-electric thruster according to one embodiment of the invention during a high exhaust velocity operation.

As shown in FIG. 2, during high thrust operation, the PPU 20 applies a current and voltage to the electrodes 18 at the face 16 of the ECESP propellant 14. The applied electrical current causes the propellant to initiate combustion 32. Propellant combustion creates a high-pressure gas 33 within the combustion chamber 34, which exhausts through the nozzle 24 to create high thrust in the conventional manner for solid rocket motors. In such an operational mode the propellant combustion and thrust production continues until the electrical power from the PPU is commanded off by the user. For the high thrust case the PPU does not charge the capacitor. For a properly optimized propellant, motor, and electrical circuit the device will produced exhaust velocities in the range of about 2500 m/s to 3000 m/s.

Operation of the device in the high exhaust velocity mode starts with the PPU 20 charging 36 the capacitor 28 to some predetermined energy and voltage level. Once the capacitor is charged the PPU switches to energize the electrodes 18 at the face of the ECESP propellant 16. In this case the PPU produces a pulse of electrical current 38 across the propellant face so as to liberate a very small mass of the propellant 40. This vaporized mass exhausts, at relatively low velocity, into the nozzle 24. Once in the nozzle, the exhaust gas makes contact with the electric electrodes 26, currently at high voltage from the capacitor pre-charging. The voltage on the electrodes, coupled with the partial ionization of the exhaust products, is sufficient to initiate a gas discharge arc 42 in the exhaust. This discharge arc further ionizes the gas and accelerates it using primarily electromagnetic forces. Specifically, electrical current through the gas interacts with the magnetic field, also created by those currents, to create a Lorentz force (F=J×B) directed out of the thruster exhaust plane. The electromagnetic acceleration is much greater than the thermal acceleration of the chemical rocket. For properly chosen electrical parameters and geometry, the device operated in the electrical mode will produce exhaust velocities in the range of about 10,000-30,000 km/s.

Regardless of the specific design, the propulsion system at its foundation combines methods for controlling the ignition, combustion rate, and extinguishment of a solid motor using an Electrically Controlled Extinguishable Solid Propellant (ECESP) and a solid propellant motor that uses such a material and is controlled by the application and removal of electrical current, and additionally the use of these ECESP propellants in an electric propulsion device known as the Pulsed Plasma.

Accordingly, although specific embodiments are disclosed herein, it is expected that persons skilled in the art can and will design alternative dual-mode propulsion systems and methods that are within the scope of the following claims either literally or under the Doctrine of Equivalents.

What is claimed is:

1. A dual-mode spacecraft thruster comprising:
   a thruster body containing a solid propellant, and having a combustion region adjacent to said solid propellant and a nozzle region adjacent to said combustion region, wherein the propellant ignites to produce a thrust only with the application of electrical power to the solid propellant;
   a source of electrical power in electrical communication with said solid propellant through a primary electrode, said primary electrode being disposed within the combustion region of the thruster body;
   a secondary electrode disposed within the nozzle region in electrical communication with said electrical power source; and
   a control system for controlling the application of the electrical power, wherein the control system is adapted to switch the thruster between a high-thrust mode wherein only the primary electrode is operated to combust the solid propellant, and a high-exhaust-velocity mode wherein first the primary electrode is triggered to atomize the propellant and then the secondary electrode is triggered to ionize and accelerate the atomized propellant.

2. The dual-mode thruster of claim 1 wherein the electrical power to the secondary electrode is provided by a high voltage intermediate energy storage device.

3. The dual-mode thruster as described in claim 1, wherein the magnitude of the thrust in the high-thrust mode is dependent on the magnitude of the electrical power applied to the solid propellant.

4. The dual-mode thruster as described in claim 1, wherein the thrust is maintained only with the continued application of the electrical power to the solid propellant.

5. The dual-mode thruster as described in claim 1, wherein the solid propellant thruster is capable of a plurality of start/stop/restart cycles.

6. The dual-mode thruster as described in claim 1, wherein the solid propellant is a solid solution propellant.

7. The dual-mode thruster as described in claim 1, wherein the primary electrode comprises at least two primary electrodes to provide electrical communication from the source to the solid propellant.

8. The dual-mode thruster as described in claim 1, wherein the thruster body further comprises a feeder mechanism to ensure continuous contact between the primary electrode and the solid propellant.

9. The dual-mode thruster as described in claim 8, wherein the solid propellant is moveable relative to the primary electrode, which is fixed and the feeder mechanism is a resilient member in contact with the solid propellant such that the solid propellant is maintained in continuous electrical communication with the primary electrode.

10. The dual-mode thruster as described in claim 8, wherein the electrode is moveable relative to the solid propellant, which is fixed and the feeder mechanism is a resilient member in contact with the primary electrode such that the primary electrode is maintained in continuous electrical communication with the solid propellant.

11. The dual-mode thruster as described in claim 1, wherein either or both of the primary electrode and secondary electrodes are made of a material selected from the group consisting of: metals, metal alloys, carbon, and conductive ceramics.

12. The dual-mode thruster as described in claim 1, wherein either or both of the primary electrode and secondary electrodes are made of one of either aluminum or copper.

13. The dual-mode thruster as described in claim 1, wherein the solid propellant has a body defining an axis disposed between an end face and a combustion face, and wherein the combustion face is aligned parallel to the thrust.

14. The dual-mode thruster as described in claim 13, wherein the body of the solid propellant has either a square or circular cross-section.

15. The dual-mode thruster as described in claim 1, wherein the primary electrode is positioned a fixed distance away from the solid propellant.

16. The dual-mode thruster as described in claim 13, wherein the thruster comprises at least two primary electrodes positioned orthogonal to the solid propellant at a fixed distance on opposite sides of the combustion face of the solid propellant.

17. The dual-mode thruster as described in claim 13, wherein the thruster comprises a parallel row of a plurality of primary electrodes positioned orthogonal to the solid propellant arranged at fixed distances across the combustion face of the solid propellant.

18. The dual-mode thruster as described in claim 13, wherein the thruster comprises at least two primary electrodes disposed on the combustion face of the solid propellant.

19. The dual-mode thruster as described in claim 18, wherein the at least two primary electrodes are cylindrical.

20. The dual-mode thruster as described in claim 18, wherein the at least two primary electrodes comprise interlocking bars containing at least one right angle.

21. The dual-mode thruster as described in claim 13, wherein the thruster comprises at least two coaxial cylindrical primary electrodes arranged on the combustion face of the solid propellant.

22. The dual-mode thruster as described in claim 13, wherein the thruster comprises at least two primary electrodes, where a first primary electrode is disposed at the combustion face and where at least one second primary electrode is disposed along the body of the solid propellant.

23. The dual-mode thruster as described in claim 22, wherein the first primary electrode comprises a cylinder having at least one passage therethrough along the axis of said cylinder, and wherein at least two second primary electrodes are disposed along at least two outer surfaces of the body of the solid propellant a fixed distance from said first primary electrode.

24. The dual-mode thruster as described in claim 22, wherein the thruster further comprises a third cylindrical primary electrode disposed within the body parallel to the axis of the solid propellant.

25. The dual-mode thruster as described in claim 13, wherein the thruster comprises at least two primary electrodes, where a first primary electrode is disposed at the combustion face and where at least one second cylindrical primary electrode is disposed within the body of the solid propellant along the axis of said solid propellant.

26. The dual-mode thruster as described in claim 25, wherein the thruster comprises at least two second cylindrical primary electrodes.

27. The dual-mode thruster as described in claim 13, wherein the thruster comprises at least one cylindrical primary electrode having at least one passage therethrough disposed on the end face of the solid propellant and at least one cylindrical primary electrode having at least one passage therethrough disposed on the combustion face of the solid propellant.

28. The dual-mode thruster as described in claim 13, comprising at least first and second primary electrodes arranged such that the solid propellant is introduced into an electrode region between the first primary electrode and the second primary electrode in a non-parallel fashion relative to the thrust.

29. The dual-mode thruster as described in claim 13, wherein the solid propellant is ignited at an end face.

30. The dual-mode thruster as described in claim 13, wherein the solid propellant is ignited within the body of the solid propellant.

31. The dual-mode thruster as described in claim 1, wherein the electrical power is selected from the group consisting of alternating current, direct current, and capacitive discharge.

32. The dual-mode thruster as described in claim 2, wherein the high voltage intermediary energy storage device is a capacitor.

33. The dual-mode thruster as described in claim 1, wherein the source of electrical power further comprises a power processing unit adapted to control the flow of electrical power to the primary and secondary electrodes based on the mode of thrust.

34. The dual-mode thruster as described in claim 1, wherein in the high thrust mode the thruster produces a thrust exhaust velocity in the range of about 2500 m/s to 3000 m/s.

35. The dual-mode thruster as described in claim 1, wherein in the high exhaust velocity mode the thruster produces a thrust exhaust velocity in the range of about 10,000-30,000 km/s.

36. A method of producing thrust in a solid propellant thruster comprising:

providing a thruster body containing a solid propellant, and having a combustion region adjacent to said solid propellant and a nozzle region adjacent to said combustion region, wherein the propellant ignites to produce a thrust only with the application of electrical power to the solid propellant;

connecting a source of electrical power with said solid propellant through a primary electrode, said primary electrode being disposed within the combustion region of the thruster body;

connecting the source of electrical power to a secondary electrode disposed within the nozzle region in electrical communication with said electrical power source; and controlling the application of the electrical power, such that in a high-thrust mode electrical power is only supplied to the primary electrode to initiate combustion of the solid propellant, and such that in a high-exhaust-velocity mode electrical power is first supplied to the primary electrode to atomize the propellant and then to the secondary electrode to ionize and accelerate the atomized propellant.

\* \* \* \* \*